(12) United States Patent
Fu et al.

(10) Patent No.: US 9,131,288 B2
(45) Date of Patent: Sep. 8, 2015

(54) G.709 BASED MULTI-STAGES MULTIPLEXING ROUTING CONTROL METHOD AND GATEWAY NETWORK ELEMENT

(75) Inventors: Xihua Fu, Shenzhen (CN); Xinling Zhang, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 161 days.

(21) Appl. No.: 13/636,807

(22) PCT Filed: Sep. 17, 2010

(86) PCT No.: PCT/CN2010/077031
§ 371 (c)(1),
(2), (4) Date: Oct. 26, 2012

(87) PCT Pub. No.: WO2011/116597
PCT Pub. Date: Sep. 29, 2011

(65) Prior Publication Data
US 2013/0202294 A1 Aug. 8, 2013

(30) Foreign Application Priority Data
Mar. 25, 2010 (CN) .......................... 2010 1 0143505

(51) Int. Cl.
*H04Q 11/00* (2006.01)
*H04J 3/16* (2006.01)
(Continued)

(52) U.S. Cl.
CPC .......... *H04Q 11/0066* (2013.01); *H04J 3/1652* (2013.01); *H04L 45/42* (2013.01);
(Continued)

(58) Field of Classification Search
CPC ... H04L 12/66; H04L 65/1013; H04L 65/102; H04L 65/1043; H04L 45/42; H04L 45/62; H04J 14/0209; H04J 14/021; H04J 14/022; H04J 14/08; H04J 3/1652; H04Q 11/0066; H04Q 11/0062

USPC ................ 370/401, 466, 467, 476; 398/43
See application file for complete search history.

(56) References Cited

U.S. PATENT DOCUMENTS

2010/0061301 A1\* 3/2010 Antal et al. ................... 370/328
2011/0116793 A1 5/2011 Zhang et al.

FOREIGN PATENT DOCUMENTS

CN 101217334 7/2008
CN 101635867 1/2010

OTHER PUBLICATIONS

Li et al., Framework for GMPLS and PCE Control of G.709 Optical Transport Networks, Feb. 27, 2010, pp. 1-24.*

(Continued)

*Primary Examiner* — Un C Cho
*Assistant Examiner* — Jeremy Costin
(74) *Attorney, Agent, or Firm* — Brooks Kushman P.C.

(57) ABSTRACT

A G.709 based multiplexing routing control method and gateway network element. The method includes carrying, in a gateway network element, the multi-stages multiplexing capability of the gateway network element in a link state broadcast data packet, and broadcasting, through a routing protocol, the multi-stages multiplexing capability of the gateway network element to the routing area or Path Computation Entity (PCE) in which the gateway network element is located. The gateway network element is configured to carry the multi-stages multiplexing capability of the gateway network element in a link state broadcast data packet, and to broadcast, through a routing protocol, the multi-stages multiplexing capability of the gateway network element to the routing area or PCE in which the gateway network element is located. This enables the multi-stages multiplexing capability of the gateway network element to be broadcasted to other network elements, resolving interconnection and intercommunication problems between new and old equipment.

12 Claims, 12 Drawing Sheets

(51) Int. Cl.
*H04L 12/717* (2013.01)
*H04L 12/721* (2013.01)

(52) U.S. Cl.
CPC ............ *H04L 45/62* (2013.01); *H04Q 11/0062* (2013.01); *H04J 2203/0067* (2013.01); *H04Q 2011/0073* (2013.01)

(56) References Cited

OTHER PUBLICATIONS

Recommendation ITU-T G.709/Y.1331, Interfaces for the Optical Transport Network (OTN), Dec. 2009, pp. 1-218.*
International Search Report for PCT/CN2010/077031, English translation attached to original, Both completed by the Chinese Patent Office on Dec. 8, 2010, All together 8 Pages.
Extended European Search Report for PCT/CN2010/077031, Completed by the European Patent Office, Dated Feb. 26, 2014, 8 Pages.
Zhang et al. Network Working Group Internet Draft Category: Informational Feb. 27, 2010, 24 Pages, "Framework for GMPLS and PCE Control of G.709 Optical Trnasport Networks."
Belotti et al. CCAMP Working Group Internet Draft Inteded Status: Standards Track Mar. 22, 2010, 22 Pages, "Traffic Engineering Extensions to OSPF for Generalized MPLS (GMPLS) Control of Evoling G.709 OTN Networks draft-belgra-ccamp-gmpls-ospf-g709-00."
Cugini et al. Optical Fiber Communication—Incudes Post Deadline Papers, Conference on, IEEE Mar. 22, 2009, 4 Pages, "PCE Communication Protocol for Resource Advertisement in Multi-domain BGP-based Networks."

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type      (17)   (IANA)     |             Length              |
+-+-+-+-+-+-+-+-+-+-+-+-+-+-+-+-+-+-+-+-+-+-+-+-+-+-+-+-+-+-+-+-+
| Num1|    Multi Stages Multiplexing    Sub-TLV 1| Num2|   Multi Stages
+-+-+-+-+-+-+-+-+-+-+-+-+-+-+-+-+-+-+-+-+-+-+-+-+-+-+-+-+-+-+-+-+
| Multiplexing    Sub-TLV 2|                 . . . . . .        |
+-+-+-+-+-+-+-+-+-+-+-+-+-+-+-+-+-+-+-+-+-+-+-+-+-+-+-+-+-+-+-+-+
```

FIG. 8

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type  (17)  (IANA)        |          Length  (60)         |
+-+-+-+-+-+-+-+-+-+-+-+-+-+-+-+-+-+-+-+-+-+-+-+-+-+-+-+-+-+-+-+-+
|0 1 0|0 0 0 0|0 0 0 1|0 0 1 1|0 1 0|0 0 0 0|0 0 1 0|0 0 1 1|0 1|
+-+-+-+-+-+-+-+-+-+-+-+-+-+-+-+-+-+-+-+-+-+-+-+-+-+-+-+-+-+-+-+-+
|0|0 0 0 1|0 0 1 0|0 0 1 1|0 1 0|0 1 1 0|0 0 1 0|0 0 1 1|
+-+-+-+-+-+-+-+-+-+-+-+-+-+-+-+-+-+-+-+-+-+-+-+-+-+-+-+
```

FIG. 10

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type  (17)  (IANA)        |          Length  (30)         |
+-+-+-+-+-+-+-+-+-+-+-+-+-+-+-+-+-+-+-+-+-+-+-+-+-+-+-+-+-+-+-+-+
|0 1 0|0 0 0 0|0 0 1 0|0 0 1 1|0 1 0|0 1 1 0|0 0 1 0|0 0 1 1|
+-+-+-+-+-+-+-+-+-+-+-+-+-+-+-+-+-+-+-+-+-+-+-+-+-+-+-+-+-+-+
```

FIG. 11

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type  (17)  (IANA)        |          Length  (30)         |
+-+-+-+-+-+-+-+-+-+-+-+-+-+-+-+-+-+-+-+-+-+-+-+-+-+-+-+-+-+-+-+-+
|0 1 0|0 0 0 0|0 0 1|0 0 1 1|0 1 0|0 0 0 0|0 0 1 0|0 0 1 1|
+-+-+-+-+-+-+-+-+-+-+-+-+-+-+-+-+-+-+-+-+-+-+-+-+-+-+-+-+
```

FIG. 12

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Type (17) (IANA)         |           Length (90)         |
+-+-+-+-+-+-+-+-+-+-+-+-+-+-+-+-+-+-+-+-+-+-+-+-+-+-+-+-+-+-+-+-+
|0 1 0|0 0 0 0|0 0 1 0|0 1 0 0|0 1 0|0 0 0 0|0 0 1 1|0 1 0 0|0 1|
+-+-+-+-+-+-+-+-+-+-+-+-+-+-+-+-+-+-+-+-+-+-+-+-+-+-+-+-+-+-+-+-+
|0|0 0 0 1|0 0 1 0|0 1 0 0|0 1 0|0 0 0 1|0 0 1 1|0 1 0 0|0 1 0|0|
+-+-+-+-+-+-+-+-+-+-+-+-+-+-+-+-+-+-+-+-+-+-+-+-+-+-+-+-+-+-+-+-+
|1 1 0|0 0 1 0|0 1 0 0|0 1 0|0 1 1 0|0 0 1 1|0 1 0 0|
+-+-+-+-+-+-+-+-+-+-+-+-+-+-+-+-+-+-+-+-+-+-+-+-+-+-+
```

FIG. 14

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Type (17) (IANA)         |           Length (60)         |
+-+-+-+-+-+-+-+-+-+-+-+-+-+-+-+-+-+-+-+-+-+-+-+-+-+-+-+-+-+-+-+-+
|0 1 0|0 0 0 0|0 0 1 0|0 1 0 0|0 1 0|0 0 0 0|0 0 1 1|0 1 0 0|0 1|
+-+-+-+-+-+-+-+-+-+-+-+-+-+-+-+-+-+-+-+-+-+-+-+-+-+-+-+-+-+-+-+-+
|0|0 1 1 0|0 0 1 0|0 1 0 0|0 1 0|0 1 1 0|0 0 1 1|0 1 0 0|
+-+-+-+-+-+-+-+-+-+-+-+-+-+-+-+-+-+-+-+-+-+-+-+-+-+-+-+-+
```

FIG. 15

G.709 BASED MULTI-STAGES MULTIPLEXING ROUTING CONTROL METHOD AND GATEWAY NETWORK ELEMENT

CROSS-REFERENCE TO RELATED APPLICATION

This application is the U.S. national phase of PCT Application No. PCT/CN2010/077031 filed Sep. 17, 2010 which claims priority from Chinese Application No. 201010143505.5 filed Mar. 25, 2010, the disclosures of which are incorporated in their entirety by reference herein.

TECHNICAL FIELD

The present invention belongs to the field of optical network transmission, and particularly, to a G.709 based multi-stage multiplexing routing control method and a gateway network element in an automatic switching optical network of optical transport network.

BACKGROUND OF THE RELATED ART

The Optical Transport Network (OTN) is a technique of digital wrapper disclosed in 1999 to solve the problem of high capacity transmission for high speed Time Division Multiplexing (TDM) signals. The OTN defined in the version of 2003 can provide functions such as transmission, multiplexing, protection and monitoring management and so on for client layer signals, the supported client layer signals are mainly Ethernet signals supported by the Synchronous Transmission Module Level N (STM-N) and Asynchronous Transmission Module (ATM) and supported through the Generic Framing Procedure (GFP), and the defined rate levels are 2.5G, 10G and 40G. With the Internet Protocol (IP) normalization for the transport network bearing signals and the popularization of a 10G Local Area Network (LAN) interface, the bearing of 10 Gigabit Ethernet (10GE) on the OTN becomes an important problem. Therefore, the International Telecommunication Union Telecommunication Standardization Sector (ITU-T) developed a supplement standard (i.e. the G.sup43 standard) for the G.709 in 2007, which defined the mode of the OTN transmitting 10GE signals.

A multiplexing system of a traditional OTN is extremely simple. And the rate levels are 2.5G, 10G and 40G, which correspond to an Optical channel Data Unit (ODU)1, ODU2, ODU3 respectively. Services of Constant Bit Rate (CBR) are mapped to corresponding ODUks by the way of Asynchronous Mapping Procedure (AMP) or Bit-synchronous Mapping Procedure (BMP), Packet services are mapped to the ODUks by the way of GFP, and then these ODUks are mapped to corresponding Optical channel Transmission Unit (OTU)ks. Certainly, the ODUs with low rate level also can be multiplexed to the ODUs with high rate level as shown in FIG. 1.

In order to adapt to multiple services, a new concept of High Order (HO) ODU and Low Order (LO) ODU is introduced in the OTN, as shown in FIG. 2, counting from the left in FIG. 2, the first column is the LO ODU, the rate levels in all frames, such as the rate level of the ODU 3, are marked as ODU3(L), and L is precisely the Low Order; the second column is the HO ODU, the rate levels in all frames, such as the rate level of the ODU3, are marked as ODU3(H), and H is precisely the High Order. The HO/LO is identical with the concept of high order/low order container in a Synchronous Digital Hierarchy (SDH), the LO ODU is equivalent to that a service layer is used to adapt to services with different rates and formats, the HO ODU is equivalent to that a tunnel is used to provide transmission capability with certain bandwidths, this layering structure supports the separation between a service board card and a circuit board card, which thus can bring more flexibility and economy to the network deployment.

Compared with the G.709, the G.709 Amendment 3 and G.sup 43 have changed greatly, and new signal types are introduced, which includes ODU0, ODU2e, ODU3e1, ODU3e2, flexible ODU (ODUflex) and ODU4. The new optical channel data unit ODU0 with a rate of 1.244 Gb/s is firstly introduced, the ODU0 can be cross-connected independently, and also can be mapped to the high order ODU (such as the ODU1, ODU2, ODU3 and ODU4). In order to adapt to the transmission for 100GE services, the ODU4 is introduced, and the rate is 104.355 Gb/s.

The ODU1 is mapped to the ODU2 and ODU3 and the ODU2 is mapped to the ODU3 by keeping a 2.5G branch timing sequence mapping and multiplexing mode of the original version G.709, and 1.25G branch timing sequences is added with the ODU1 being mapped to the ODU2 and ODU3, and a 1.25G branch timing sequence is added with the ODU2 being mapped to the ODU3; all the other new rates (the ODU0, ODU2e and ODUflex) are mapped to the ODU1, ODU2, ODU3 and ODU4 with a 1.25G branch timing sequence mapping and multiplexing mode. According to the G.sup 43, the ODU2e can be mapped to a 2.5G branch timing sequence of the ODU3e1, and the ODU2e also can be mapped to the 1.25G branch timing sequence of the ODU3e1. Most of the low order ODUs have the same number of branch timing sequences in the high order. However, the ODU2e is an exception, and the ODU2e needs to occupy 9 1.25G branch timing sequences or 5 2.5G branch timing sequences in the ODU3, but needs to occupy 8 1.25G branch timing sequences in the ODU4. FIG. 3 is a detailed mapping and multiplexing path structure of the G.709 standard and G.sup43 standard.

The idea of Flexible ODU was widely discussed at the ITU-T Q11/SG15 intermediate meeting in September, 2008 and the ITU-T SG15 plenary meeting in December, 2008 initially. The initial thought of Flexible ODU is to provide bit transparent transmission of the OTN for client signals with arbitrary bit rates. The ODUflex is currently expected to be used for supporting those new bit rates which can be mapped to the ODU2, ODU3 or ODU4 effectively. The ODUflex is taken as one low order ODU; one ODUflex occupies the branch timing sequences whose number is the arbitrary integral multiple of branch timing sequences of the high order ODUk. The ODUflex bandwidth can be adjusted dynamically.

Currently, the size of Packet ODUflex is recommended to be: n×1.24416 Gbit/s±20 ppm (1≤n≤80), and the size of CBR ODUflex is 239/238 times of the client signal rate. The newly defined ODUflex will not provide mapping for the client signals which have been mapped to the ODU0, ODU1, ODU2 and ODU3 any more. With regard to CBR client signals, it is the first choice to map the client signals to the ODUflex through the BMP, and the ODUflex rate is 239/238 times of the client signal rate (above the 2.5G client signal rate). With regard to Packet service client signals, it is currently discussed that the client signals are mapped to the ODUflex using the GFP; ODUflex=n*1.24416G, wherein 1≤n≤80; and the ODUflex bit rate is integer multiple of the number of branch timing sequences of the high order ODUk.

After the G.709 standard of version 2003 is released, OTN devices are deployed abundantly after the development for several years, and the latest G.709 standard are also changed largely, after the newly deployed OTN devices are loaded with control planes, one end-to-end label switching path may control a great many old devices and new devices simultaneously, the old devices can only support a 2.5G branch timing sequence unit, and the new devices can support both the 2.5G branch timing sequence unit and 1.25G branch timing sequence unit; when one end-to-end label switching path goes through the old devices and new devices, the related interconnections during the management of end-to-end services become a technical problem existing in the reality.

As shown in FIG. 4, the OTN has been deployed in the network, the implementation of all node devices in the OTN is based on the G.709 standard version released in 2003, and each node in the network does not support the ODU0 and ODUflex and is based on the 2.5G branch timing sequence. With the larger-scale application of data services, operators need to introduce the applications of ODU0 and ODUflex into the existing network, when the applications of the ODU0 and ODUflex are introduced into the existing network, a problem of interconnection between the networks supporting the 1.25G Timing Sequence (TS) and the deployed networks supporting the 2.5G TS occurs, if no other technologies are introduced, the operators have to upgrade all nodes in the existing network to support the ODU0 and ODUflex, and this certainly will destroy the OTNs which have been invested by the operators.

One end-to-end ODUk service may go through a great many old devices and new devices simultaneously, the old devices can only support the 2.5G branch timing sequence unit, and the new devices can support both the 2.5G branch timing sequence unit and 1.25G branch timing sequence unit; when one end-to-end ODUk goes through the old devices and new devices, the related interconnections during the management of end-to-end services become a technical problem existing in the reality. Meanwhile, the problem of introducing services of the ODU0 and ODUflex into the OTN to perform interconnection with the deployed networks also occurs.

SUMMARY OF THE INVENTION

The technical problem required to be solved by the present invention is to provide a G.709 based multi-stage multiplexing routing control method and a gateway network element in an automatic switching optical network of optical transport network.

In order to solve the above problem, the present invention provides a G.709 based multi-stage multiplexing routing control method, which comprises that:

The multi-stage multiplexing capability of the gateway network element is carried in a link state advertisement data packet, and the multi-stage multiplexing capability of the gateway network element is advertised to a routing domain in which the gateway network element is located or a path computation entity through a routing protocol, so as to implement multi-stage multiplexing of an optical transport network through the gateway network element.

The above method can further be characterized in that: the multi-stage multiplexing capability of the gateway network element is the multi-stage multiplexing capability generated by the gateway network element according to the information obtained by detecting a line card and port of the node of itself; or is a multi-stage multiplexing capability configured by a management plane received by the gateway network element.

The above method can further be characterized in that: when the gateway network element receives the multi-stage multiplexing capability configured by the management plane, the method further comprises: checking whether a data plane supports the multi-stage multiplexing capability configured by the management plane.

The above method can further be characterized in that: the routing protocol is Open Shortest Path First Interior Gateway Protocol-Traffic Engineering (OSPF-TE) or Intermediate System-to-Intermediate System-Traffic Engineering (IS-IS-TE).

The above method can further be characterized in that:
in the step of a gateway network element carrying a multi-stage multiplexing capability of the gateway network element in a link state advertisement data packet,
a Multi Stages Multiplex Constraints Sub-Type Length Value (Sub-TLV) is added into a Top Level Type Length Value (TLV) of the link state advertisement data packet of a link type, the multi-stage multiplexing capability of the gateway network element is carried using the Multi Stages Multiplex Constraints Sub-TLV, and the Multi Stages Multiplex Constraints Sub-TLV includes a type field, a length field and a multi-stage multiplexing capability information field, wherein:
the type field is configured to: indicate a type of the Multi Stages Multiplex Constraints Sub-TLV;
the length field is configured to: indicate a length of the multi-stage multiplexing capability information field;
the multi-stage multiplexing capability information field is configured to: indicate the supported specific multi-stage multiplexing capability;
in the step of advertising the multi-stage multiplexing capability of the gateway network element to a routing domain in which the gateway network element is located or a path computation entity through a routing protocol,
the routing protocol is expanded, which makes the routing protocol support to carry the multi-stage multiplexing capability.

The above method can further be characterized in that: the multi-stage multiplexing capability information field includes M subfields, each subfield describes one multi-stage multiplexing capability, each subfield includes a multi-stage multiplexing layer number information field and a multi-stage multiplexing signal type information field, and the M means the number of supported multi-stage multiplexing capabilities, wherein:
the multi-stage multiplexing layer number information field is configured to: indicate the number of layers of the multi-stage multiplexing;
the multi-stage multiplexing signal type information field is configured to: indicate each signal type of the multi stage multiplexing.

The present invention further provides a gateway network element, which is configured to: carry a multi-stage multiplexing capability of the gateway network element in a link state advertisement data packet, and advertise the multi-stage multiplexing capability of the gateway network element to a routing domain in which the gateway network element is located or a path computation entity through a routing protocol.

The above gateway network element can further be characterized in that: the gateway network element is further configured to: generate the multi-stage multiplexing capability according to the information obtained by detecting a line card and port of the node of itself; or receive a multi-stage multiplexing capability configured by a management plane.

The above gateway network element can further be characterized in that: the gateway network element is further configured to: when receiving the multi-stage multiplexing capability configured by the management plane, check whether a data plane supports the multi-stage multiplexing capability configured by the management plane.

The above gateway network element can further be characterized in that: the routing protocol is Open Shortest Path First Interior Gateway Protocol-Traffic Engineering (OSPF-TE) or Intermediate System-to-Intermediate System-Traffic Engineering (IS-IS-TE).

The above gateway network element can further be characterized in that: the gateway network element is configured to: use a Multi Stages Multiplex Constraints Sub-Type Length Value (Sub-TLV) newly added in a Top Level Type Length Value (TLV) of the link state advertisement data packet of a link type to carry the multi-stage multiplexing capability of the gateway network element, and the Multi Stages Multiplex Constraints Sub-TLV includes a type field, a length field and a multi-stage multiplexing capability information field, wherein:

the type field is configured to: indicate a type of the Multi Stages Multiplex Constraints Sub-TLV;

the length field is configured to: indicate a length of the multi-stage multiplexing capability information field; and the multi-stage multiplexing capability information field is configured to: indicate the supported specific multi-stage multiplexing capability.

The above gateway network element can further be characterized in that: the multi-stage multiplexing capability information field includes M subfields, each subfield describes one multi-stage multiplexing capability, each subfield includes a multi-stage multiplexing layer number information field and a multi-stage multiplexing signal type information field, and the M means a number of supported multi-stage multiplexing capabilities, wherein:

the multi-stage multiplexing layer number information field is configured to: indicate the number of layers of the multi-stage multiplexing;

the multi-stage multiplexing signal type information field is configured to: indicate each signal type of the multi stage multiplexing.

In the present invention, the gateway network element advertises the multi-stage multiplexing capability of the gateway network element to other network elements through the routing protocol.

BRIEF DESCRIPTION OF DRAWINGS

FIG. 8 is a coding pattern of the Multi Stages Multiplex Constraints Sub-Type Length Value (Sub-TLV) put forward by the present invention.

FIG. 10 is a coding schematic diagram of the Multi Stages Multiplex Constraints Sub-TLV when the Gateway 1 advertises multi-stage multiplexing capabilities supported on the current node to the whole routing domain through the Open Shortest Path First Interior Gateway Protocol-Traffic Engineering (OSPF-TE).

FIG. 11 is a coding schematic diagram of the Multi Stages Multiplex Constraints Sub-TLV when the Gateway 3 advertises multi-stage multiplexing capabilities supported on the current node to the whole routing domain through the OSPF-TE.

FIG. 12 is a coding schematic diagram of the Multi Stages Multiplex Constraints Sub-TLV when the Gateway 4 advertises multi-stage multiplexing capabilities supported on the current node to the whole routing domain through the OSPF-TE.

FIG. 14 is a coding schematic diagram of the Gateway 5 advertising multi-stage multiplexing capabilities supported on the current node to the whole routing domain through the OSPF-TE.

FIG. 15 is a coding schematic diagram of the Gateway 7 advertising multi-stage multiplexing capabilities supported on the current node to the whole routing domain through the OSPF-TE.

PREFERRED EMBODIMENTS OF THE PRESENT INVENTION

The present invention will be further described in combination with the accompanying drawings and specific examples below.

An OTN standard always supports single-stage ODU multiplexing. A subsequent result in an OTN v1 is precisely that ODU1 is mapped directly to a branch timing sequence of an ODU3, which is not required to firstly be mapped to an ODU2. A motivation of the system architecture is to reduce complexity. In a normal evolution process of the system architecture, the newly added OTN functions are expected to have higher rates, and thus the concept of single-stage multiplexing will be propelled forward more easily. That is to say, if all the rates increase upward, it may be very easy to continue to use the single-stage multiplexing in the OTN system architecture. An ODU0 and an ODUflex are introduced in the OTN layer architecture, which makes the newly added ODUk signal rates much lower than the existing rates, and this will bring some different challenges for the newly added rates can be clients of the existing rates. Therefore, an extremely distinct application exists, two-stage multiplexing is expected to facilitate introducing signals of ODU0 and ODUflex in the existing network, and thus it is not required to update each node in the existing network. When the two-stage multiplexing is used in one domain, operators can be permitted to apply the limitations of new rates on those nodes which only need to support these new rates. The two-stage multiplexing is expected to facilitate introducing the signals of ODU0 and ODUflex in the existing network, and thus it is not required to update each node in the existing network. However, it is required to introduce Gateway network elements to support multi-stage multiplexing.

In the present invention, it is to put forward introducing the Gateway network elements in the existing network or upgrading certain existing network elements as the gateway network elements, and implementing the Multi Stage Multiplexing on these gateway network elements, so as to be able to introduce applications of ODU0 and ODUflex in the deployed networks, solve the interconnection between the 1.25G TS networks and the deployed networks supporting 2.5G TS, and complete the conversion between a 1.25G TS signal and a 2.5G TS signal. Not only the existing OTN investments of the operators are protected, but also new ODUk applications can be introduced in the invested OTNs.

Figure 1:
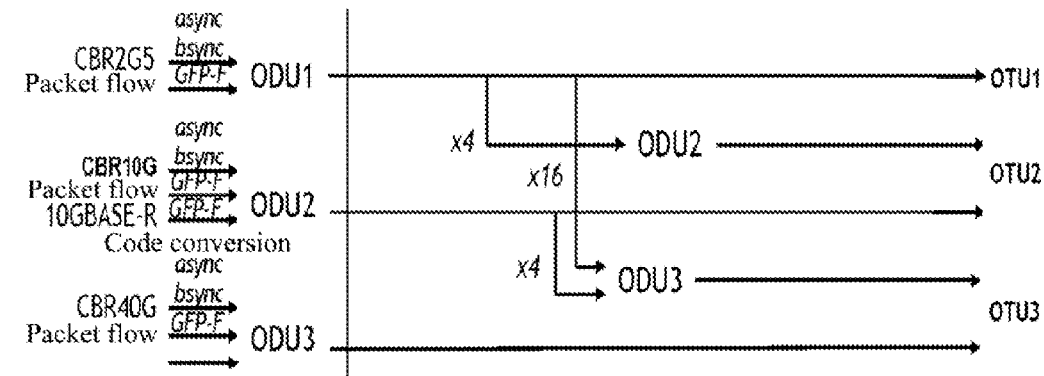
FIG. 1 is a mapping and multiplexing structure hold by the G.709 standard published in 2003.
Figure 2:
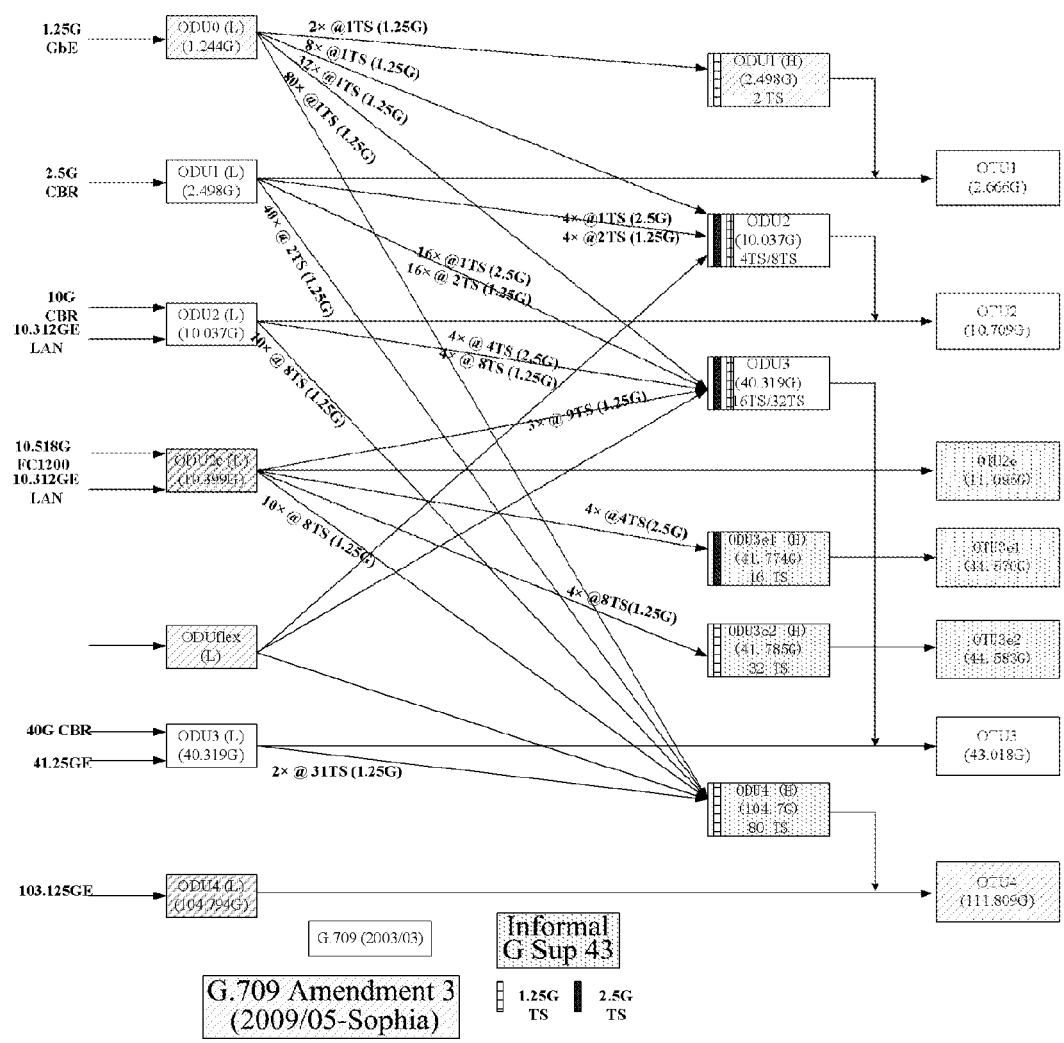
FIG. 2 is a mapping and multiplexing structure hold by the G.709 Amendment3 and the G.sup 43 standard.
Figure 3:
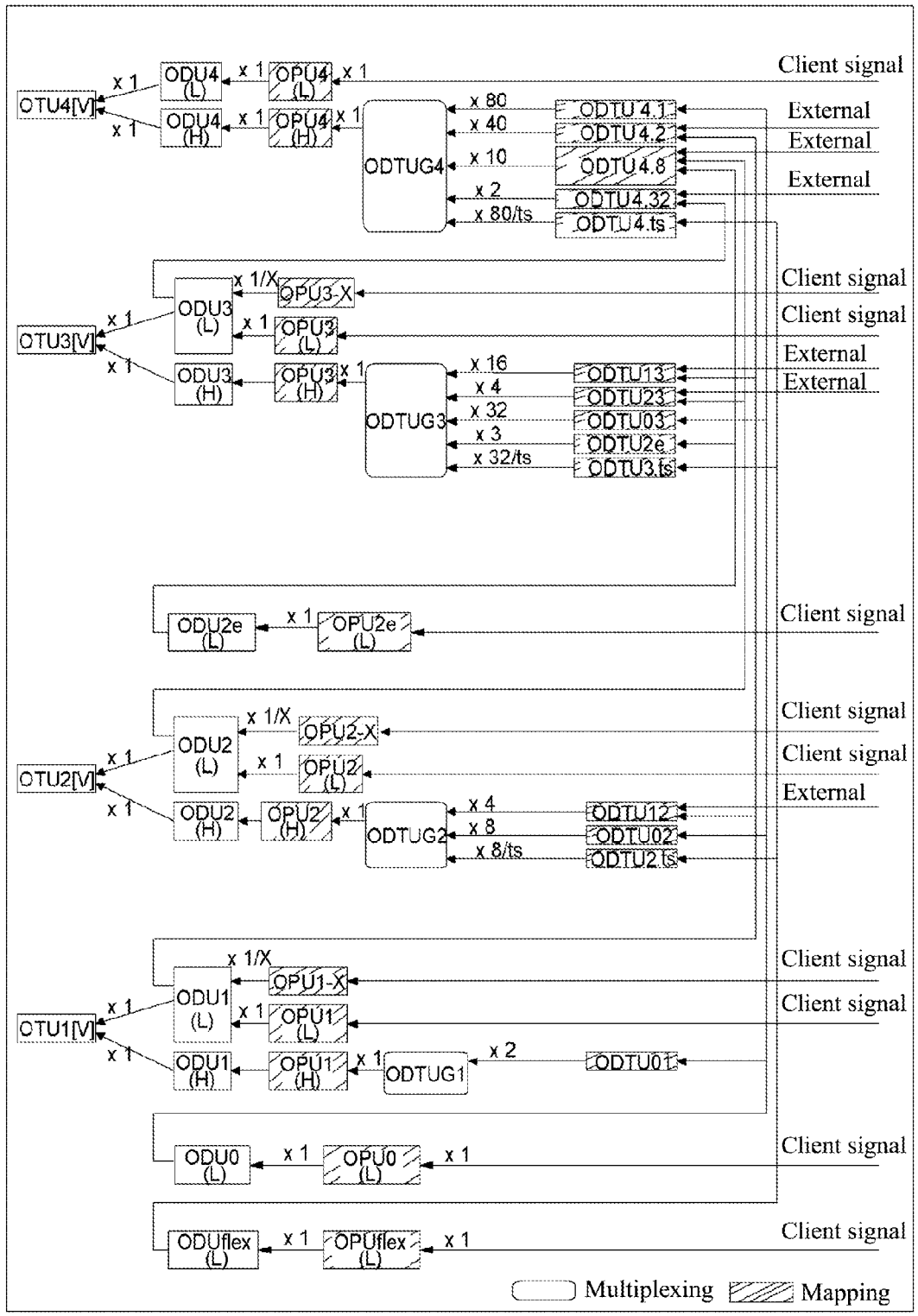
FIG. 3 is a detailed mapping and multiplexing structure of the G.709 standard and the G.sup 43 standard.
Figure 4:
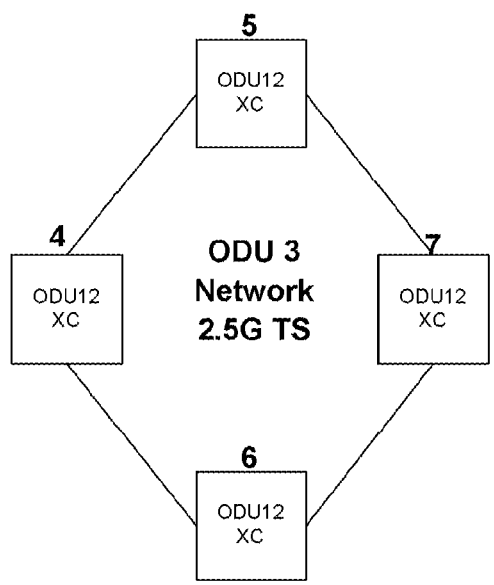
FIG. 4 is an OTN which has been invested and deployed by the operators, the implementation of all node devices in the network is based on the G.709 standard released in 2003, and each node in the network does not support the ODU0 and ODUflex and is based on the 2.5G branch timing sequence.
Figure 5:
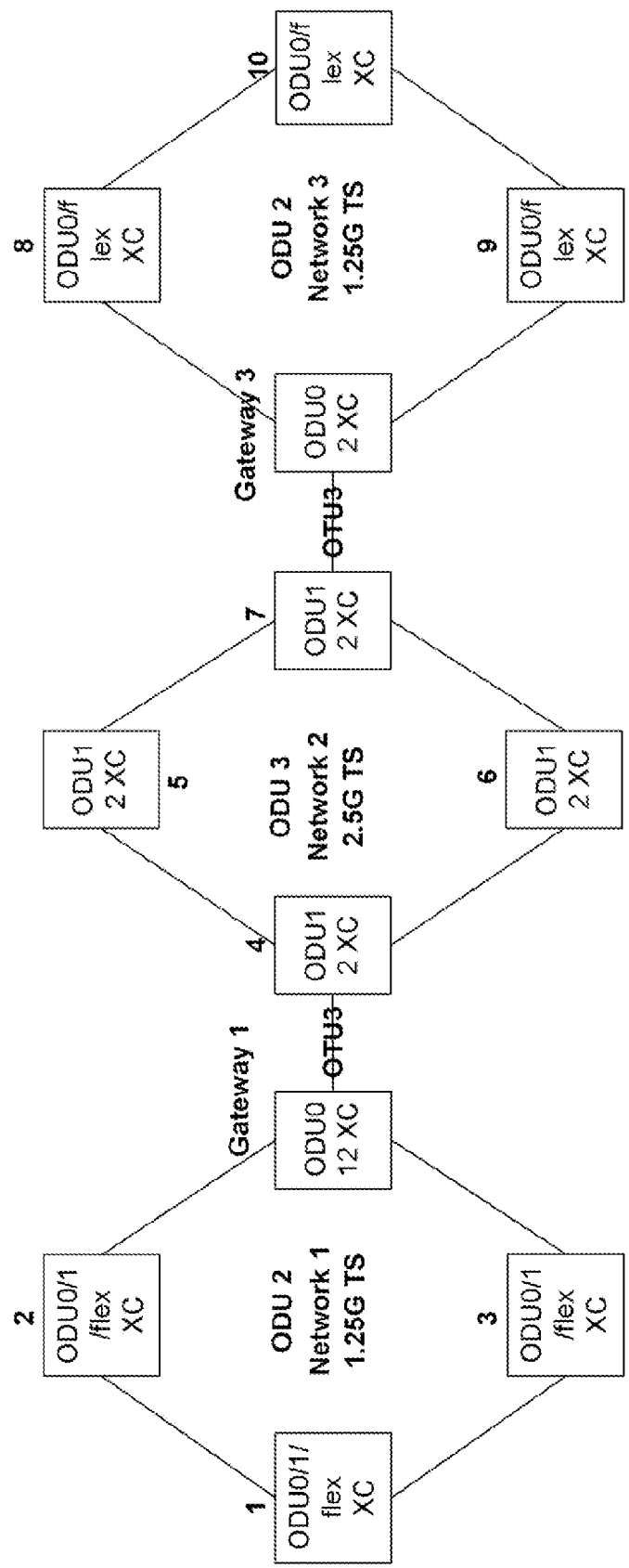
FIG. 5 is a network structure to introduce gateway network elements supporting the multi stage multiplexing when an OTN device supporting signals of ODU0 and ODUflex is added to the existing network shown in FIG. 4. Since the gateway network elements are introduced, it is not required to update each node in the existing network.

The network shown in FIG. 4 is upgraded to obtain the network shown in FIG. 5, the gateway network elements included in the network support the two-stage multiplexing, thereby permitting to support the ODU0/ODUflex in the deployed networks. The ODU0/ODUflex is firstly mapped to the ODU1 or ODU2, and then the ODU1/ODU2 is mapped to the ODU3 immediately; nodes 4, 5, 6 and 7 are not required to see the ODU0 but switch the ODU1 or ODU2 directly, which can not only protect the existing investments of the operators, but also introduce new applications and services to give added values to the existing network investments of the operators.

Figure 6:
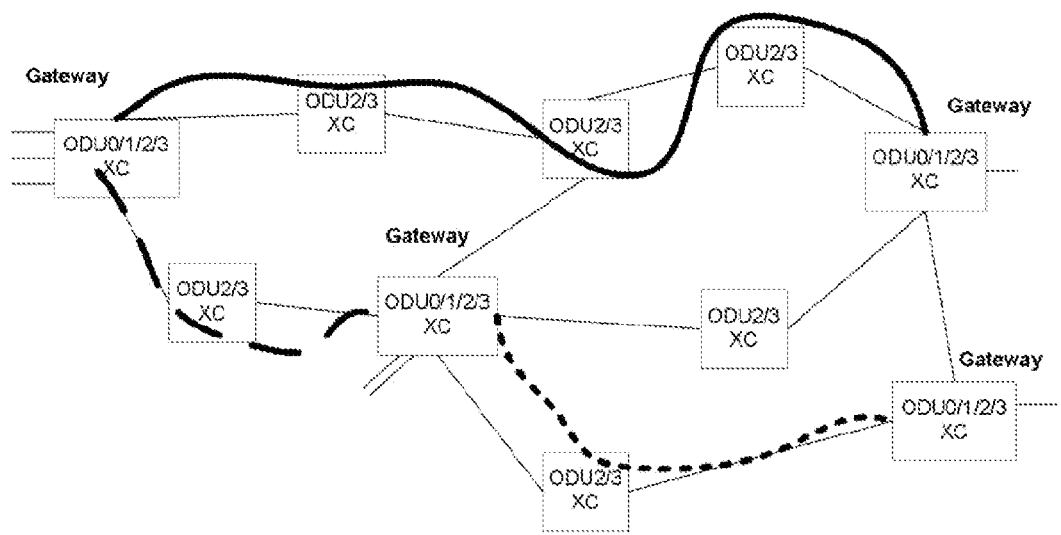
FIG. 6 is a structure diagram of OTN of the network design based on tunnels, which introduces the Gateway network elements, and firstly multiplexes the ODU0 and ODUflex to the ODU2 or ODU3 to minimize the number of connections required to be established at intermediate nodes.

Besides the network upgrade scenario, the second potential two-stage multiplexing application is a network design based on tunnels. In an ODU4 network, each ODU4 has 80 branch timing sequences. It is assumed that a large number of ODU0s and ODUflexs need 3~4 branch timing sequences. If a great quantity of circuit services share the same terminal point (or even a section of the whole path), from a management perspective, the Gateway network elements are introduced, and the ODU0 and ODUflex are firstly multiplexed to the ODU2 or ODU3 to minimize the number of connections required to be established at intermediate nodes. The ODU2/ODU3 effectively establishes a tunnel used by the ODU0/ODUflex and going through the ODU4 network. In the ODU4 network as shown in FIG. 6, the ODU0/ODUflex is only visible to non gateway network elements. Though the two-stage multiplexing increases the complexity of the gateway network elements, the two-stage multiplexing reduces the number of cross-connections required to be configured at other non-gateway network element nodes.

Figure 7:
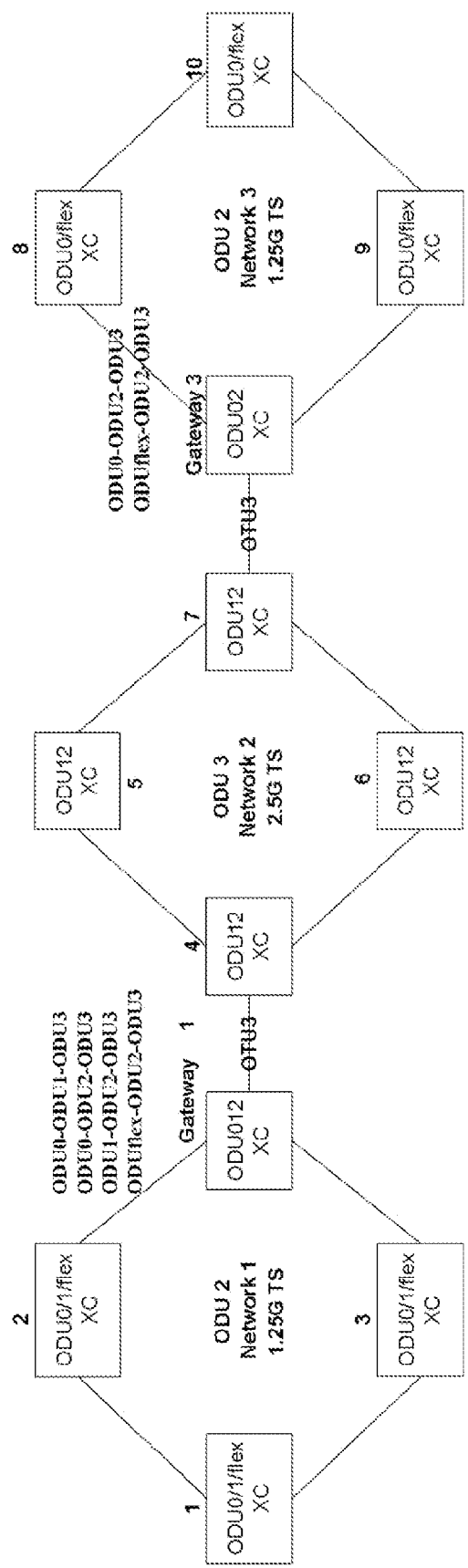
FIG. 7 is a network structure to introduce gateway network elements supporting the multi stage multiplexing when an OTN device supporting signals of ODU0 and ODUflex is added to the existing network shown in FIG. 4. Multi-stage multiplexing capabilities supported by the gateway network elements are different.

A management plane and a control plane use the related art to obtain detailed information of each link in the OTN, and the information includes a granularity size of branch timing sequence supported by the link, the maximum number of the supported branch timing sequences (i.e. the maximum bandwidth of the link), the number of available branch timing sequences of the current link and a low order signal type which can be supported by the link. However, with regard to links located between a Gateway 1 and node 4 and between a Gateway 3 and node 7 in FIG. 7, since the ODU0 can be mapped to the ODU3 Network 2 through the two stage multiplexing (that is, the ODU0 can be mapped to the ODU1 or ODU2, and then the ODU1 or ODU2 are mapped to the ODU3), if only low order signals supported by these links are known, it is not enough for a path computation entity to compute routing, and it is also required to know the way by which the ODU0 is mapped to the ODU3 Network 2, that is, multi-stage multiplexing capabilities supported by the links between the Gateway 1 and node 4 and between the Gateway 3 and node 7 must be known by the path computation entity. Therefore, before computing an end-to-end ODUk service at the management plane or the control plane, multi-stage multiplexing capability restriction information of the gateway network elements in the network must be obtained. In addition, the path computation entity in the control plane can obtain the multi-stage multiplexing capabilities of the network elements by expanding an auto-discovery protocol or a routing protocol.

Therefore, in the present invention, it is to put forward the routing control method for the path computation entity acquiring the information about the gateway network elements supporting the multi-stage multiplexing capability, so that, when the gateway network elements are introduced in the existing OTNs, the path computation entity of the end-to-end ODUk service can determine the gateway passed by as the network elements for the end-to-end ODUk service and select the appropriate multi-stage multiplexing capabilities on the gateway network elements.

The present invention provides a G.709 based multiplexing routing control method, which comprises:

a gateway network element carrying a multi-stage multiplexing capability of the gateway network element in a link state advertisement data packet, and advertising the multi-stage multiplexing capability of the gateway network element to a routing domain in which the gateway network element is located or a path computation entity through a routing protocol. The routing protocol is Open Shortest Path First Interior Gateway Protocol-Traffic Engineering (OSPF-TE) or Intermediate System-to-Intermediate System-Traffic Engineering (IS-IS-TE).

Figure 16:
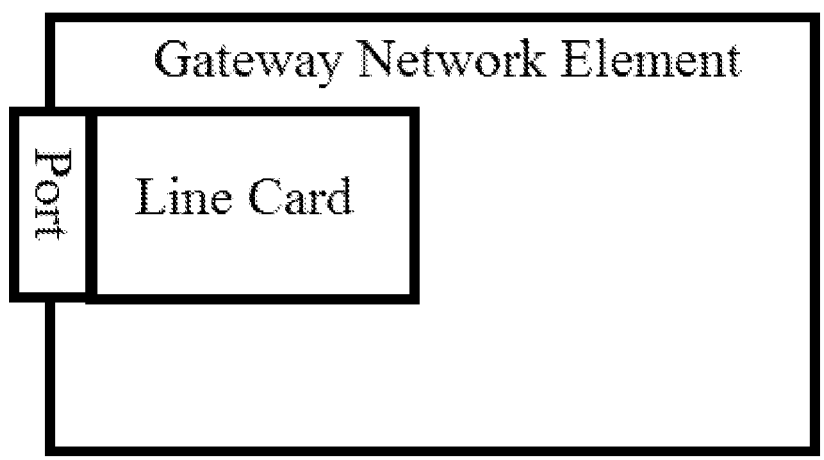
FIG. 16 is a schematic diagram of the Gateway network element.

Wherein, the multistage multiplexing capability of the gateway network element is the multi-stage multiplexing capability generated by the gateway network element according to the information obtained by detecting a line card and port, as shown in FIG. 16, of the node of itself; or is a multi-stage multiplexing capability configured by a management plane received by the gateway network element. Wherein, when receiving the multi-stage multiplexing capability configured by the management plane, the gateway network element also checks whether a data plane supports the multi-stage multiplexing capability configured by the management plane.

Wherein, the routing protocol is expanded, which makes the routing protocol support to carry the multi-stage multiplexing capability. a Multi Stages Multiplex Constraints Sub-Type Length Value (Sub-TLV) is added in a Top Level Type Length Value (TLV) of the link state advertisement data packet of a link type, the multi-stage multiplexing capability of the gateway network element is carried using the Multi Stages Multiplex Constraints Sub-TLV, and the Multi Stages Multiplex Constraints Sub-TLV includes a type field, a length field and a multi-stage multiplexing capability information field, wherein:

the type field is configured to: indicate a type of the subtype length value;

the length field is configured to: indicate a length of the multi-stage multiplexing capability information field;

the multi-stage multiplexing capability information field is configured to: indicate the supported specific multi-stage multiplexing capability, the multi-stage multiplexing capability information field includes M subfields, each subfield describes one multi-stage multiplexing capability, each subfield includes a multi-stage multiplexing layer number information field and a multi-stage multiplexing signal type information field, and the M means the number of supported multi-stage multiplexing capabilities, wherein:

the multi-stage multiplexing layer number information field is configured to: indicate the number of layers of the multi-stage multiplexing;

the multi-stage multiplexing signal type information field is configured to: indicate each signal type of the multi stage multiplexing.

The present invention will be further described in combination with the specific examples below.

EXAMPLE 1

In order to advertise multi-stage multiplexing capability information of a gateway network element to a routing domain in which the gateway network element is located through a routing protocol (Open Shortest Path First Interior Gateway Protocol-Traffic Engineering (OSPF-TE) or Intermediate System-to-Intermediate System-Traffic Engineering (IS-IS-TE)), routing information is expanded in the present invention.

According to the related art and standards, the rfc2370 defines an Opaque Link State Advertisement (LSA), and according to a scope in which the Opaque LSA can be flooded, defines three Opaque LSA types, namely an LSA type 9, an LSA type 10 and an LSA type 11 respectively. The Opaque LSA type 11 can be flooded in the whole Autonomous System (AS) scope; the flooded scope of the Opaque LSA type 10 can not exceed an Area related to the LSA; the Opaque LSA type 9 can only be flooded in a local network or a subnetwork. The rfc3630 expands the Opaque LSA, and defines a new LSA, so as to support a Traffic Engineering (TE) LSA. The TE LSA defined by the rfc3630 is an Opaque LSA and only can be flooded within the Area scope.

The rfc4203 adds 4 sub-Type Length Values (TLV), which are used to support Generalized Multiprotocol Label Switching (GMPLS), in a Top Level TLV of a data packet of a link type defined by the rfc3630, including: Link Local/Remote Identifiers, Link Protection Type, Interface Switching Capability Descriptor and Shared Risk Link Group. The definition of the original rfc4203 is as shown in Table 1 below, but the rfc4203 does not add new Top Level TLVs.

TABLE 1

Top Level TLV defined in the rfc4203

| Sub-TLV Type | Length | Name |
| --- | --- | --- |
| 11 | 8 | Link Local/Remote Identifiers |
| 14 | 4 | Link Protection Type |
| 15 | variable | Interface Switching Capability Descriptor |
| 16 | variable | Shared Risk Link Group |

In the present invention, it puts forward adding one more sub-TLV in the Top Level TLV of the link defined by the rfc4203, and the sub-TLV is named as a Multi Stages Multiplex Constraints Sub-TLV as shown in Table 2 below.

TABLE 2

Sub-TLV newly added in the present invention

| Sub-TLV Type | Length | Name |
| --- | --- | --- |
| 17 | variable | Multi Stages Multiplex Constraints Sub-TLV |

In the above example, a Type value of the Multi Stages Multiplex Constraints Sub-TLV is 17, and also can be other values as required, which is not limited by the present invention.

As shown in FIG. 8, a coding method of the Multi Stages Multiplex Constraints Sub-TLV is proposed in the present invention, which includes: a Type field, Length field and a multi-stage multiplexing capability information field, wherein:

the Type field indicates a type of the object, and may take a value of 17, which is only an example here, other values also can be taken as the value of the Type field as required.

the Length field is used to indicate a length of the multi-stage multiplexing capability information field;

the multi-stage multiplexing capability information field includes M subfields, each subfield indicates one multi-stage multiplexing capability; each subfield includes a multi-stage multiplexing layer number information (Num) field and a multi-stage multiplexing signal type information field (Multi Stages Multiplexing Sub-TLV), which indicate the number of layers of the multi-stage multiplexing and each signal type of the multi stage multiplexing respectively, and M means the number of the specified multi-stage multiplexing capabilities.

For example, Num 1 means the layer number of multi-stage multiplexing of the first supported multi-stage multiplexing capability, and Multi Stages Multiplexing Sub-TLV 1 means the signal type of multi-stage multiplexing of the first supported multi-stage multiplexing capability; Num 2 means the layer number of multi-stage multiplexing of the second supported multi-stage multiplexing capability, and Multi Stages Multiplexing Sub-TLV 2 means the signal type of multi-stage multiplexing of the second supported multi-stage multiplexing capability; and so on, Num M means the layer number of multi-stage multiplexing of the Mth supported multi-stage multiplexing capability, and Multi Stages Multiplexing Sub-TLV M means the signal type of multi-stage multiplexing of the Mth supported multi-stage multiplexing capability.

A coding scheme of the Multi Stages Multiplex Constraints Sub-TLV will be given below.

The Sub TLV Type is 17;

The Num 1 field means the layer number of multi-stage multiplexing of the first supported multi-stage multiplexing capability (method) information, which can be represented using 3 bits (other number of bits can be used as required, the number of bits is not limited in the present invention). For example, when ODU0-ODU2-ODU3 needs to be represented, 2 is filled into the Num 1 field, thereafter every 4 bits (other number of bits can be used as required, the number of bits is not limited in the present invention) represents a certain ODUk (k=0, 1, 2, 2e, flex, 3, 4), and there are 3 groups in total. Wherein, coding of the signal type is shown as follows:

0000:ODU0
0001:ODU1
0010:ODU2
0011:ODU3
0100:ODU4
0101:ODU2e
0110:ODUflex

The above coding mode is only an example, and other coding modes also can be used to represent the ODUk, which is not limited by the present invention.

The Num 2 means the layer number of multi-stage multiplexing of the second supported multi-stage multiplexing capability (method) information, For example, when ODU0-ODU1-ODU3 needs to be represented, 2 is filled in the Num 2 field, and thereafter every 4 bits represents a certain ODUk.

The Length field is $(Num1+1)*4+(Num2+1)*4+\ldots+(Num\ M+1)*4+M*3$, wherein M is the number of the multi-stage multiplexing capabilities.

EXAMPLE 2

Figure 9:
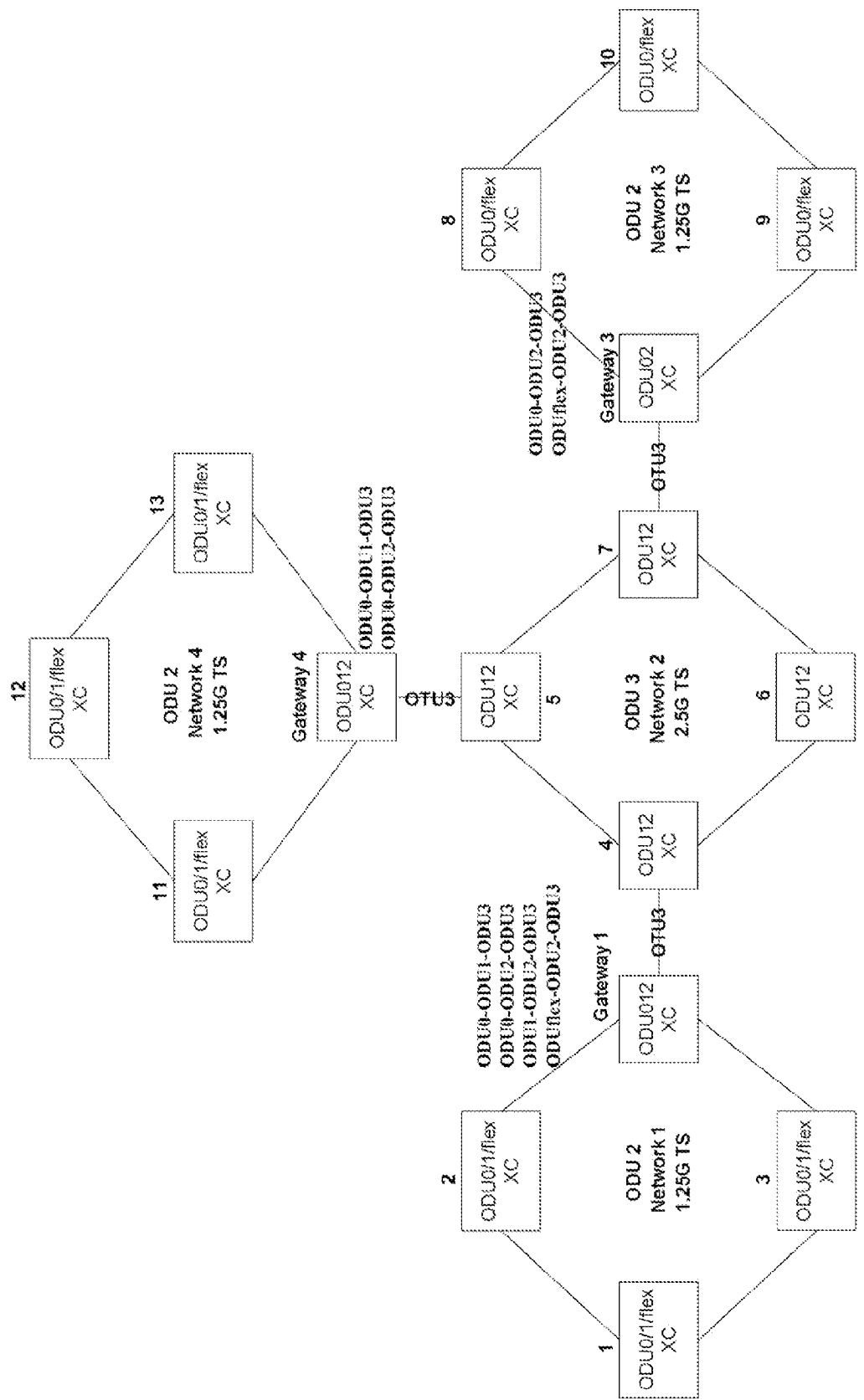
FIG. 9 is a network architecture diagram after introducing the gateway network elements when an OTN device supporting signals of ODU0 and ODUflex is added to the existing network shown in FIG. 4.

As shown in FIG. 9, based on FIG. 4, after introducing the Gateway network elements in the existing network and deploying the OTN device nodes implemented according to the latest version of G.709 standard, 3 10G OTNs and 1 40G OTN are constituted. The 4 networks are classified in one routing domain.

A granularity size of branch timing sequence supported by each link in the 10G OTN networks is the 1.25G TS. Wherein, the 3 10G OTNs are interconnected with the 40G OTN through the Gateway network elements, i.e, Gateway 1, Gateway 3 and Gateway 4, and links therebetween are OTU3 links. The switching capacities supported by the nodes in the 3 10G OTNs are also different, wherein the nodes 1, 2, 3 and Gateway 1 in an ODU2 Network 1 only support the switching capacities of the ODU0, ODU1 and ODUflex. The nodes 11, 12, 13 and Gateway 4 in an ODU2 Network 4 only support the switching capacities of the ODU0, ODUflex and ODU1. The nodes 8, 9, 10 and Gateway 3 in an ODU2 Network 3 only support the switching capacities of the ODU0 and ODUflex. The reason is that the operators only want the ODU2 Network 3 to be responsible for accessing services of 1 GigE (ODU0) and 10 GigE (ODU2/ODU2e) only, thus only performing ODU0/ODU2 switching is more economic and it is unnecessary to perform ODU1 switching. Wherein the multi-stage multiplexing capabilities supported by the gateway network elements are shown as follows.

The multi stage multiplexing capabilities supported by the Gateway 1 include:

ODU0-ODU1-ODU3

ODU0-ODU2-ODU3

ODU1-ODU2-ODU3

ODUflex-ODU2-ODU3

The multi stage multiplexing capabilities supported by the Gateway 3 include:

ODU0-ODU2-ODU3

ODUflex-ODU2-ODU3

The multi stage multiplexing capabilities supported by the Gateway 4 include:

ODU0-ODU1-ODU3

ODU0-ODU2-ODU3

The reason why the Gateway 4 does not support the ODUflex-ODU2-ODU3 multi-stage multiplexing is mainly that the relevant ODUflex applications considered by the operators are only limited to the interior of the ODU2 Network 4, no ODUflex beyond the scope of the ODU2 Network 4 exists. That is to say, the ODUflex applications will not go through the ODU3 Network 2, and thus the network element Gateway 4 is unnecessary to support the ODUflex-ODU2-ODU3 multi-stage multiplexing.

Therefore, the Gateway 1 advertises the multi-stage multiplexing capabilities supported on the current node to the whole routing domain through an OSPF-TE, and the Multi Stages Multiplex Constraints Sub-TLV coding is as shown in FIG. 10.

The Gateway 3 advertises the multi-stage multiplexing capabilities supported on the current node to the whole routing domain through the OSPF-TE, and the Multi Stages Multiplex Constraints Sub-TLV coding is as shown in FIG. 11.

The Gateway 4 advertises the multi-stage multiplexing capabilities supported on the current node to the whole routing domain through the OSPF-TE, and the Multi Stages Multiplex Constraints Sub-TLV coding is as shown in FIG. 12.

EXAMPLE 3

Figure 13:
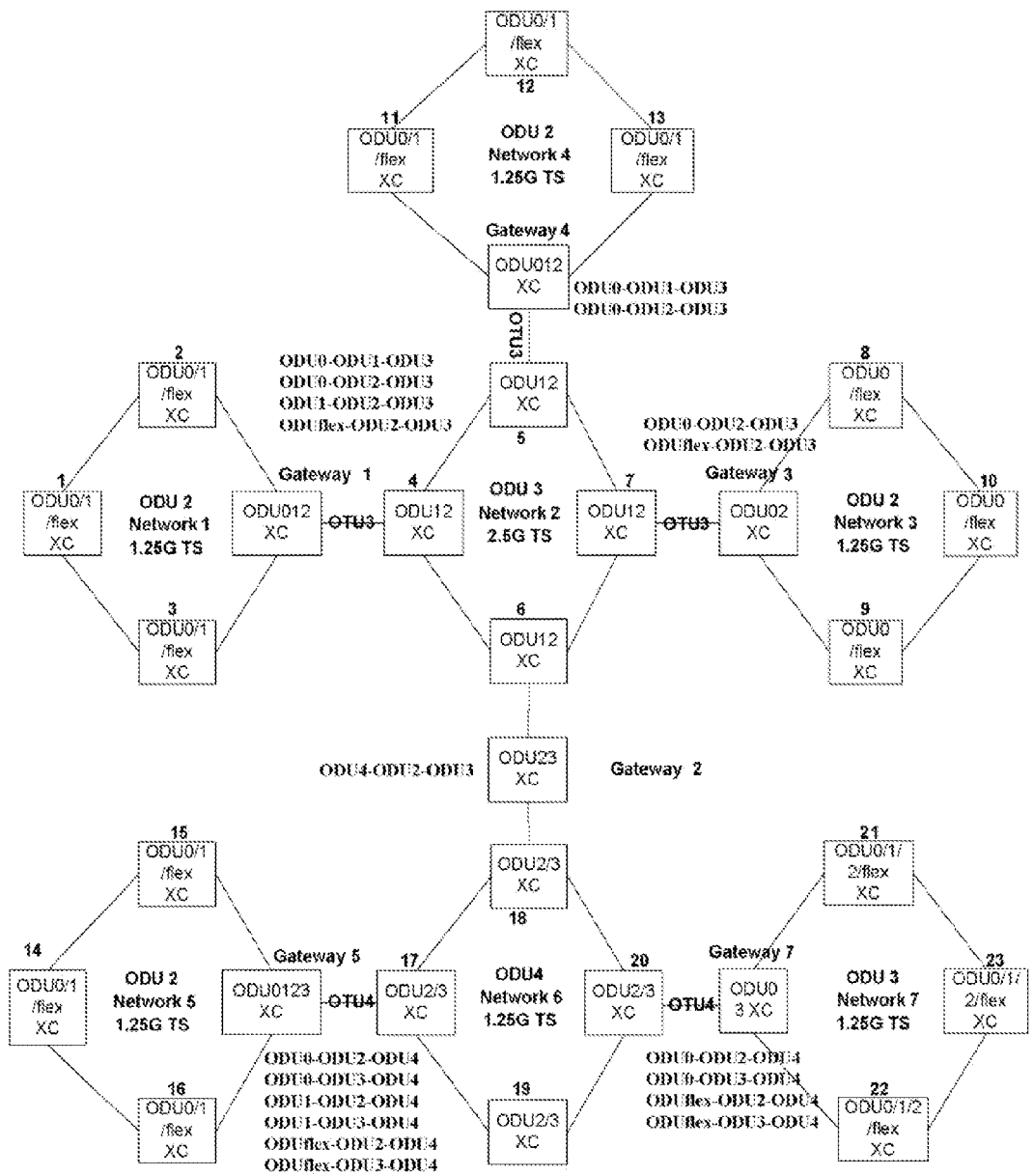
FIG. 13 is a schematic diagram of OTN composed by interconnections of a 10G OTN, a 40G OTN and a 100G OTN further invested and established by the operators and the OTN based on FIG. 9.

The operators newly expand certain OTNs based on the invested OTNs as shown in FIG. 9. As shown in FIG. 13, the OTNs newly deployed by the operators are three networks, namely a 10G ODU2 Network 5, a 40G ODU3 Network 7 and a 100G ODU4 Network 6 respectively. In order to reduce the number of cross-connections with respect to the end-to-end services such as the ODU0 service and ODUflex service and so on within the ODU4 Network 6, all nodes in the ODU4 Network 6 only perform switching capabilities of the ODU2 (10G) granularity and ODU (40G) granularity.

Wherein, many local ODU0/ODU1/ODUflex services exist within the ODU2 Network 5 (that is to say, these services are limited to the interior of the ODU2 Network 5 and will not pass through the ODU4 Network 6). If certain ODUk services exist, e.g., a GigE (ODU0) is accessed at a node 15, it is required to span the ODU4 Network 6, and transmit the services to a node 21 in the ODU3 Network 7 through an ultra-long span transmission capability of the ODU4 Network 6. With the related art, an ODU2 tunnel can be directly established between the node 15 and node 21, and then the ODU0 is multiplexed and demultiplexed to the ODU2 tunnel on the node 15 and node 21 directly. However, the method has some defects, for if it is in the condition that the number of ODU0 services needing the ultra-long span transmission is not large (e.g., only one such ODU0 end-to-end service exists), ODU2 tunnels are specially established for these services which have low rates and need the ultra-long span transmission inside the ODU2 Network 5 and ODU3 Network 7, and in the condition that many local services can not share these tunnels inside the ODU2 Network 5 and ODU3 Network 7, for the operators, plenty of bandwidths for such end-to-end services needing the ultra-long span transmission will be wasted. Therefore, the best method is to establish the ODU2 tunnels or ODU3 tunnels directly between a Gateway 5 and a Gateway 7, these tunnels are shared by the services with low order rates spanning the ODU2 Network 5, ODU2 Network 6 and ODU3 Network 7, but these services with low order rates are scheduled directly inside the ODU2 Network 5 and ODU2 Network 6 respectively, and it is not required to establish the ODU2 tunnels or ODU3 tunnels in advance. However, it is required to introduce the gateway network elements, firstly map ODU0/ODU1/ODUflex to an ODU2 or ODU3 on the Gateway 5 and Gateway 7, and then map the ODU2 or ODU3 to an ODU4.

As shown in FIG. 13, the multi-stage multiplexing capabilities supported by the newly introduced gateway network elements are shown as follows.

The multi-stage multiplexing capabilities supported by the network element Gateway 5 include:
ODU0-ODU2-ODU4
ODU0-ODU3-ODU4
ODU1-ODU2-ODU4
ODU1-ODU3-ODU4
ODUflex-ODU2-ODU4
ODUflex-ODU3-ODU4

The multi-stage multiplexing capabilities supported by the network element Gateway 7 include:
ODU0-ODU2-ODU4
ODU0-ODU3-ODU4
ODUflex-ODU2-ODU4
ODUflex-ODU3-ODU4

Therefore, the Gateway 5 advertises the multi-stage multiplexing capabilities supported on the current node to the whole routing domain through the OSPF-TE, and the Multi Stages Multiplex Constraints Sub-TLV coding is as shown in FIG. 14.

The Gateway 7 advertises the multi-stage multiplexing capabilities supported on the current node to the whole routing domain through the OSPF-TE, and the Multi Stages Multiplex Constraints Sub-TLV coding is as shown in FIG. 15.

The present invention also provides a gateway network element, and the gateway network element is configured to: carry a multi-stage multiplexing capability of the gateway network element in a link state advertisement data packet, and advertise the multi-stage multiplexing capability of the gateway network element to a routing domain in which the gateway network element is located or a path computation entity through a routing protocol.

Wherein, the gateway network element is further configured to: generate the multi-stage multiplexing capability according to the information obtained by detecting a line card and port of the node of itself; or receive the multi-stage multiplexing capability configured by a management plane.

Wherein, the gateway network element is further configured to: when receiving the multi-stage multiplexing capability configured by the management plane, check whether a data plane supports the multi-stage multiplexing capability configured by the management plane.

Wherein, the routing protocol is OSPF-TE or IS-IS-TE.

Wherein, the gateway network element is configured to: use a Multi Stages Multiplex Constraints Sub-TLV newly added in a Top Level TLV of the link state advertisement data packet of a link type to carry the multi-stage multiplexing capability of the gateway network element, and the Multi Stages Multiplex Constraints Sub-TLV includes a type field, a length field and a multi-stage multiplexing capability information field, wherein:

the type field is configured to: indicate a type of the subtype length value;

the length field is configured to: indicate a length of the multi-stage multiplexing capability information field; and the multi-stage multiplexing capability information field is configured to: indicate the supported specific multi-stage multiplexing capability.

Wherein, the multi-stage multiplexing capability information field includes M subfields, each subfield describes one multi-stage multiplexing capability, each subfield includes a multi-stage multiplexing layer number information field and a multi-stage multiplexing signal type information field, and the M means the number of supported multi-stage multiplexing capabilities, wherein:

the multi-stage multiplexing layer number information field is configured to: indicate the number of layers of the multi-stage multiplexing;

the multi-stage multiplexing signal type information field is configured to: indicate each signal type of the multi stage multiplexing.

Specifically, the descriptions in the method examples can be referred, which will not be repeated here.

Industrial Applicability

With the G.709 based multi-stage multiplexing routing control method and the gateway network element provided by the present invention, advertising the multi-stage multiplexing capability of the gateway network element to other network elements is better implemented, thereby better solving the problem of interconnection between new devices and old devices.

What is claimed is:

1. A G.709 based multi-stage multiplexing routing control method, comprising:

a gateway network element carrying a multi-stage multiplexing capability of the gateway network element in a link state advertisement data packet, and advertising the multi-stage multiplexing capability of the gateway network element to a routing domain in which the gateway network element is located or a path computation entity through a routing protocol, so as to implement multi-stage multiplexing of an optical transport network through the gateway network element;

wherein the multi-stage multiplexing capability indicates capability of multi-stage multiplexing of an optical channel data unit, which means the gateway network element supports at least two-stage multiplexing of the optical channel data unit (ODU), at this moment ODUi could be mapped to ODUj and then the ODUj could be mapped to ODUk immediately on the gateway network element, wherein the ODUi, ODUj and ODUk represent three different kinds of ODUs;

in the step of a gateway network element carrying a multi-stage multiplexing capability of the gateway network element in a link state advertisement data packet, a Multi Stages Multiplex Constraints Sub-Type Length Value (Sub-TLV) is added in a Top Level Type Length Value (TLV) of the link state advertisement data packet of a link type, the multi-stage multiplexing capability of the gateway network element is carried by using the Multi Stages Multiplex Constraints Sub-TLV, and the Multi Stages Multiplex Constraints Sub-TLV includes a multi-stage multiplexing capability information field, wherein the multi-stage multiplexing capability information field is configured to: indicate the supported specific multi-stage multiplexing capability;

in the step of advertising the multi-stage multiplexing capability of the gateway network element to a routing domain in which the gateway network element is located or a path computation entity through a routing protocol, the routing protocol is expanded, which makes the routing protocol support to carry the multi-stage multiplexing capability;

wherein, the multi-stage multiplexing capability information field includes M subfields, each subfield describes one multi-stage multiplexing capability, each subfield includes a multi-stage multiplexing layer number information field and a multi-stage multiplexing signal type information field, and the M means a number of supported multi-stage multiplexing capabilities, wherein:

the multi-stage multiplexing layer number information field is configured to: indicate a number of layers of the multi-stage multiplexing;

the multi-stage multiplexing signal type information field is configured to: indicate each signal type of the multi stage multiplexing.

2. The method according to claim 1, wherein,
the multi-stage multiplexing capability of the gateway network element is the multi-stage multiplexing capability generated by the gateway network element according to information obtained by detecting line cards and ports of a node of itself; or is a multi-stage multiplexing capability configured by a management plane received by the gateway network element.

3. The method according to claim 2, wherein, when the gateway network element receives the multi-stage multiplexing capability configured by the management plane, the method further comprises: checking whether a data plane supports the multi-stage multiplexing capability configured by the management plane.

4. The method according to claim 1, wherein, the routing protocol is Open Shortest Path First Interior Gateway Protocol-Traffic Engineering (OSPF-TE) or Intermediate System-to-Intermediate System-Traffic Engineering (IS-IS-TE).

5. The method according to claim 4, wherein,
the Multi Stages Multiplex Constraints Sub-TLV further includes a type field and a length field, wherein:
the type field is configured to: indicate a type of the Multi Stages Multiplex Constraints Sub-TLV;
the length field is configured to: indicate a length of the multi-stage multiplexing capability information field.

6. The method according to claim 1, wherein,
the Multi Stages Multiplex Constraints Sub-TLV further includes a type field and a length field, wherein:
the type field is configured to: indicate a type of the Multi Stages Multiplex Constraints Sub-TLV;
the length field is configured to: indicate a length of the multi-stage multiplexing capability information field.

7. A gateway network element, comprising: a line card and a port, wherein, the line card is configured to:
carry a multi-stage multiplexing capability of the gateway network element in a link state advertisement data packet, and advertise, through the port, the multi-stage multiplexing capability of the gateway network element to a routing domain in which the gateway network element is located or a path computation entity through a routing protocol,
wherein, the multi-stage multiplexing capability indicates capability of multi-stage multiplexing of an optical channel data unit, which means the gateway network element supports at least two-stage multiplexing of the optical channel data unit (ODU), at this moment ODUi could be mapped to ODUj and then the ODUj could be mapped to ODUk immediately on the gateway network element, wherein the ODUi, ODUj and ODUk represent three different kinds of ODUs;
wherein, the gateway network element is configured to: use a Multi Stages Multiplex Constraints Sub-Type Length Value (Sub-TLV) newly added in a Top Level Type Length Value (TLV) of the link state advertisement data packet of a link type to carry the multi-stage multiplexing capability of the gateway network element, and the Multi Stages Multiplex Constraints Sub-TLV includes a multi-stage multiplexing capability information field, wherein the multi-stage multiplexing capability information field is configured to: indicate the supported specific multi-stage multiplexing capability;
wherein, the multi-stage multiplexing capability information field includes M subfields, each subfield describes one multi-stage multiplexing capability, each subfield includes a multi-stage multiplexing layer number information field and a multi-stage multiplexing signal type information field, and the M means a number of supported multi-stage multiplexing capabilities, wherein:
the multi-stage multiplexing layer number information field is configured to: indicate a number of layers of the multi-stage multiplexing;
the multi-stage multiplexing signal type information field is configured to: indicate each signal type of the multi stage multiplexing.

8. The gateway network element according to claim 7, wherein, the gateway network element is further configured to: generate the multi-stage multiplexing capability according to information obtained by detecting line cards and ports of a node of itself; or receive a multi-stage multiplexing capability configured by a management plane.

9. The gateway network element according to claim 8, wherein, the gateway network element is further configured to: when receiving the multi-stage multiplexing capability configured by the management plane, check whether a data plane supports the multi-stage multiplexing capability configured by the management plane.

10. The gateway network element according to claim 7, wherein, the routing protocol is Open Shortest Path First Interior Gateway Protocol-Traffic Engineering (OSPF-TE) or Intermediate System-to-Intermediate System-Traffic Engineering (IS-IS-TE).

11. The gateway network element according to claim 10, wherein, the Multi Stages Multiplex Constraints Sub-TLV includes a type field and a length field, wherein:
the type field is configured to: indicate a type of the Multi Stages Multiplex Constraints Sub-TLV;
the length field is configured to: indicate a length of the multi-stage multiplexing capability information field.

12. The gateway network element according to claim 7, wherein, the Multi Stages Multiplex Constraints Sub-TLV includes a type field and a length field, wherein:
the type field is configured to: indicate a type of the Multi Stages Multiplex Constraints Sub-TLV;
the length field is configured to: indicate a length of the multi-stage multiplexing capability information field.

* * * * *